United States Patent [19]

Garthe

[11] 4,332,162

[45] Jun. 1, 1982

[54] DEVICE FOR INDICATING THE ECONOMICAL OPERATING RANGE OF AN ENGINE

[75] Inventor: Hellmut Garthe, Cologne, Fed. Rep. of Germany

[73] Assignee: Klöckner-Humboldt-Deutz Aktiengesellschaft, Cologne, Fed. Rep. of Germany

[21] Appl. No.: 181,627

[22] Filed: Aug. 26, 1980

[30] Foreign Application Priority Data

Aug. 29, 1979 [DE] Fed. Rep. of Germany ....... 2934839

[51] Int. Cl.³ ...................... G01M 15/00; G01L 5/13
[52] U.S. Cl. ................................. 73/117.3; 116/62.4; 116/300
[58] Field of Search ...................... 116/62.4, 216, 300, 116/280; 73/117.3, 346, 344

[56] References Cited

U.S. PATENT DOCUMENTS

| 791,785 | 6/1905 | Hertzberg et al. | 116/300 |
| 3,678,742 | 7/1972 | Westcott et al. | 73/117.3 |
| 3,686,941 | 8/1972 | Kramasz et al. | 73/117.3 |

FOREIGN PATENT DOCUMENTS

| 618329 | 2/1949 | United Kingdom | 116/62.4 |

*Primary Examiner*—Robert I. Smith
*Attorney, Agent, or Firm*—Becker & Becker, Inc.

[57] ABSTRACT

A device for indicating the economical operating range of an internal combustion engine. The device includes two indicating elements arranged in a common housing. One indicating element indicates the momentary load condition of the internal combustion engine, and the other indicates the momentary speed. Each indicating element has its own measured value scale, lying in a common plane with that of the other, and also has an indicator needle. Each measured value scale includes an upper limit value and a lower limit value which are dependent upon the characteristic of the internal combustion engine being measured, and which define the economical operating range of the internal combustion engine as a function of the parameter being measured. The economical operating range of the internal combustion engine is indicated as a surface externally of both measured value scales, whereby the surface is limited by straight lines which extend from the pivot axes of the indicator elements through the pertaining lower and upper limit values on the respective measured value scale. Furthermore, the indicator needles are of such a length and are so arranged at such a height that they intersect or cross each other in the economical operating range.

1 Claim, 1 Drawing Figure

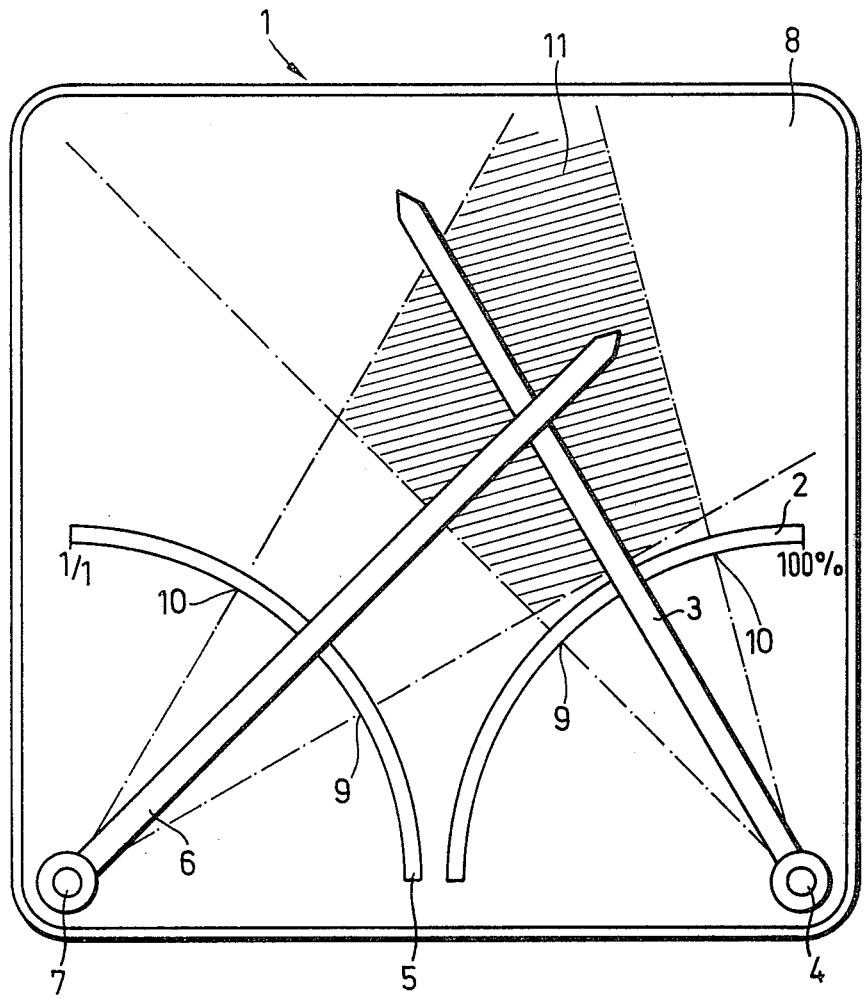

DEVICE FOR INDICATING THE ECONOMICAL OPERATING RANGE OF AN ENGINE

The present invention relates to a device for indicating the economical operating range of an internal combustion engine. The device includes two indicating elements arranged in a common housing. One indicating element indicates the momentary speed, and the other indicates the momentary load condition of the internal combustion engine. Each indicating element has its own measured value scale lying in a common plane, as well as an indicator needle associated therewith.

It is known to equip internal combustion engines, especially those which are installed in motor vehicles, with a tachometer or speed measuring means in order to indicate the optimum speed range of the internal combustion engine. The speed measuring means or tachometer alone, however, is not suitable to provide any indications about an economical operation of the internal combustion engine. For this purpose, it is necessary, aside from the speed, to know a further parameter.

From so-called "fuel-consumption performance graphs" it is known to use the mean effective pressure or the delivered torque as a second parameter for indicating the specific fuel consumption. This second parameter can generally be designated as "load".

A measuring device indicating both of these engine parameters is disclosed in German Gebrauchsmuster 69 47 397. This indicating device has two measuring scales, arranged parallel to each other, with measured value indicators independent of each other, whereby one measuring mechanism indicates the speed and the other mechanism indicates the injected fuel quantity. The correct correlation of the fuel injection quantity to the particular speed is given when both measuring mechanism indicators are located across from each other.

This device, however, has the disadvantage that practically no tolerance ranges are given, so that the attaining and remaining of the internal combustion engine in an economical range requires a continuous control. This is possible only with great difficulty, especially when such an indicating instrument is used in motor vehicles.

It is therefore an object of the present invention to provide a device of the initially mentioned type which simply and with certainty indicates the attaining and remaining of the internal combustion engine in the economical range, so that the device is also suitable for installation in motor vehicles.

This object, and other objects and advantages of the present invention, will appear more clearly from the following specification in connection with the accompanying drawing, which illustrates a preferred embodiment of the indicating device of the present invention.

The indicating device of the present invention is characterized primarily in that each measured value scale includes a lower limit value and an upper limit value which are dependent upon the characteristic of the internal combustion engine being measured, and which, as a function of the parameter being measured, define the economical operating range of the engine. This device has the advantage that with one glance there can be determined whether both indicators are located within the tolerance field associated therewith. Such a control is to be carried out without increased attention, so that this device is especially suitable for use in motor vehicles. A further advantage of the device is recognizable therein that no values need to be applied any more on the measured value scales, and that, aside from the limit value markings, no further information needs to be delivered which would otherwise require increased attention during reading-off and determining of the values thereof.

The indicating capability of the inventive device can be still further increased if the economical operating range of the internal combustion engine is indicated as a surface externally of both measured value scales, whereby the surface is limited by straight lines which extend from the pivot axes of the indicating elements through the pertaining lower and upper limit values on the respective measured value scales, and the indicator needles are of such a length and are arranged at such a height that they intersect or cross one another in the economical operating range. The indication of the indicating element is simplified by this embodiment, since it is now no longer necessary to monitor and read two indicators and two separate scales, but rather only two indicators or needles which cross each other in a common tolerance field.

If the economical operating range is distinguished or set apart from the remaining ranges of the plane of the measured value scales and from the colors of the measured value indicators by a different color, then the monitoring of the inventive device is simplified to such an extent that then there need only be observed whether both indicators cross each other in the field which is distinguished by a certain color.

Suitable as a measure for the momentary loading condition there can be taken the exhaust gas temperature of the internal combustion engine, or, with internal combustion engines equipped with injection pumps, the control rod path or the injected fuel quantity are suitable for such a purpose.

The measuring and/or indicating mechanisms may be either mechanically or strictly electronically operating structural elements.

Referring now to the drawing in detail, the single view shows the measuring or indicating device 1, the measured value scale 2 for the speed with its indicator needle 3 and pivot axis 4, and also a measured value scale 5 for the load with its indicator needle 6 and pivot axis 7.

Both measured value scales 2 and 5 are arranged in a common plane 8. Both indicator needles 3 and 6 have the same length, but are arranged at different heights or levels so that they can cross or overlap each other.

A lower limit value 9 and an upper limit value 10 are marked on each measured value scale. The economical operating range 11 of the internal combustion engine is defined in the plane 8 of the measured value scales 2 and 5 thereby that straight lines from each pivot axis 4 and 7 extend through the lower and upper limit values 9 and 10 and intersect each other externally of the measured value scales. The economical operating range 11 is expediently emphasized somehow, for example by a different color.

So long as both indicator needles 3 and 6 cross each other in the operating range during the operation of the internal combustion engine, one is assured that the internal combustion engine is operating in a manner which is advantageous from a consumption standpoint. Only when both indicator needles 3 and 6 no longer cross each other in the range 11, can, by changing the injected fuel quantity or the gear or speed selection with internal combustion engines installed in motor vehicles, a change of the indicator needles be brought about in such a manner that they cross each other again in the region 11.

The present invention is, of course, in no way restricted to the specific disclosure of the specification and drawing, but also encompasses any modifications within the scope of the appended claims.

What I claim is:

1. A device for indicating the economical operating range of an internal combustion engine, said device comprising in combination:

a housing;

a first indicating element, in said housing, for indicating the speed of said internal combustion engine at any given moment;

a second indicating element, in said housing, for indicating the load condition of said internal combustion engine at any given moment;

a respective measured-value scale for each of said indicating elements, said scales being located in a common plane and each having a lower limit value and an upper limit value indicated thereon, said limit values being dependent upon the characteristic of the internal combustion engine being measured, said limit values defining the economical operating range of said internal combustion engine as a function of the parameter being measured; and a respective indicator needle for each of said indicating elements, each needle being rotatable about a respective pivot axis for movement over an associated measured-value scale, said economical operating range being a common tolerance field comprising a surface beyond said measured-value scales, and being defined by straight lines which extend from said pivot axes of said needles through the associated lower and upper limit values on the respective measured-value scale, said needles being of such a length, and being arranged at such a height, that they intersect in said economical operating range readily monitored in common so that said needles, cross each other in a common tolerance field to eliminate need to monitor and read two indicators and two separate scales, said economical operating range having a predetermined color which differs from that of said common plane of said scales and that of said indicator needles so as to be set off therefrom, only one glance being required to determine whether both needles are located within the tolerance field associated therewith and to observe whether both needles cross each other in the field which is distinguished by the predetermined color.

* * * * *